(12) United States Patent  (10) Patent No.: US 7,162,805 B2
Vick  (45) Date of Patent: Jan. 16, 2007

(54) MEASURING AND MARKING GUIDE TOOL

(76) Inventor: Daniel S. Vick, 312 2nd St. South, Delano, MN (US) 55328

( * ) Notice: Subject to any disclaimer, the term of this patent is extended or adjusted under 35 U.S.C. 154(b) by 0 days.

(21) Appl. No.: 11/042,285

(22) Filed: Jan. 25, 2005

(65) Prior Publication Data

US 2006/0162174 A1 Jul. 27, 2006

(51) Int. Cl.
B43L 13/02 (2006.01)
B43L 7/00 (2006.01)
(52) U.S. Cl. ................. 33/42; 33/760; 33/483
(58) Field of Classification Search ........ 33/27.02, 33/27.03, 27.032, 32.1, 32.2, 41.1, 42, DIG. 1, 33/759, 760, 768, 483, 485
See application file for complete search history.

(56) References Cited

U.S. PATENT DOCUMENTS

| 1,639,580 | A | * | 8/1927 | Thompson | 33/DIG. 1 |
| 3,315,361 | A | * | 4/1967 | Mutter | 33/27.03 |
| 4,503,624 | A | * | 3/1985 | Whiteford | 33/42 |
| 4,538,354 | A | * | 9/1985 | Smolik | 33/DIG. 1 |
| 4,653,194 | A | * | 3/1987 | Kim | 33/DIG. 1 |
| 4,702,012 | A | | 10/1987 | Miller | |
| 4,890,393 | A | | 1/1990 | St. Jean | |
| 5,735,052 | A | * | 4/1998 | Lin | 33/27.03 |
| 6,173,505 | B1 | | 1/2001 | Munno | |
| 6,216,355 | B1 | * | 4/2001 | Darnell | 33/42 |
| 6,226,885 | B1 | | 5/2001 | Korich | |
| 6,457,247 | B1 | * | 10/2002 | Lin | 33/27.03 |
| 6,532,674 | B1 | | 3/2003 | Farese | |
| 6,839,974 | B1 | * | 1/2005 | Hitchcock | 33/DIG. 1 |
| 2001/0020334 | A1 | * | 9/2001 | Wrobbell | 33/42 |
| 2005/0044734 | A1 | * | 3/2005 | Carroll | 33/42 |
| 2005/0144793 | A1 | * | 7/2005 | Nelson et al. | 33/42 |
| 2005/0178014 | A1 | * | 8/2005 | Tepei | 33/42 |

* cited by examiner

*Primary Examiner*—G. Bradley Bennett
(74) *Attorney, Agent, or Firm*—Nikolai & Mersereau, P.A.; C. G. Mersereau

(57) ABSTRACT

A unitary guide tool that provides a guide for measuring and marking a work piece when moved along an edge thereof, the guide tool being in the form of a generally rectangular offset or stepped bar of material having a thicker section forming a stepped side for engaging the edge of a work piece in a first disposition and engaging a measuring tape dispensing housing in another disposition, the block being slidable along an edge of the work piece and having a longer dimension extending generally perpendicular thereto.

9 Claims, 4 Drawing Sheets

– – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – – –

MEASURING AND MARKING GUIDE TOOL

BACKGROUND OF THE INVENTION

I. Field of the Invention

The present invention relates to marking guide tools generally and, more particularly, to a one-piece multi-use marking guide tool suitable for use alone, or in conjunction with a retractable metal measuring tape, in measuring and marking a work piece; or employed with a cutting tool or other device.

II. Related Art

It has long been a common practice for wood workers such as carpenters or the like to scribe lines along and parallel to the edges of boards or sheets of building material such as plywood using a marker and a retractable tape or the like. The tape is grasped between fingers of one hand extended to the desired measurement location and a marking pencil or other marking tool is held against the end of the tape using the other hand and thereafter a line is scribed along the work piece by moving and following the tape along the edge of the work piece. While the technique has long been used and is generally successful, it requires the user's fingers to slide along in contact with the edge of the work piece and injuries including slivers and abrasions to the fingers of the sliding hand holding the tape are common, making this technique less than desirable in that respect. In addition, accuracy may suffer if the relationship between the tape and the work piece shifts at all during scribing.

Guides have been devised for marking work pieces in conjunction with retractable metal measuring tapes that attach directly to the housings for the retractable tapes. Examples of such devices are illustrated and described in U.S. Pat. Nos. 4,890,393; 4,702,012; and 6,173,505 B1. While such appliances have been used with some success, all of these arrangements are multiple-component systems which need to be attached and detached from a tape housing. There clearly remains a need for a simple one-piece pocket tool that need not be attached to an associated tape housing when used with a retractable metal tape for measuring and scribing a line along a work piece or the like. It would also be desirable if such an article could also be used without the tape and have still other additional uses.

SUMMARY OF THE INVENTION

By means of the present invention, there is provided a simplified unitary guide device or tool that provides a guide suitable for measuring and marking a work piece when moved along an edge of the work piece. The guide tool can be used with or without a retractable tape. The guide tool is in the form of an elongate, generally rectangular block or bar having an offset segment which forms a step preferably toward the end of one side for engaging the edge of a work piece in a first disposition and engaging a measuring tape dispenser housing in another disposition. The block is slidable along the edge of a work piece and has a longer dimension designed to extend generally perpendicular to an engaged edge of a work piece. The opposed sides of the guide tool are generally parallel and flat except for the offset or step.

The guide tool further can be provided with scales on one or both opposed sides including one or more series of spaced aligned holes or openings along the length of the block for use in marking the work piece with the block in the first described disposition. The tool can also be used with the flat side against the work piece to enable the user to scribe arcs with the assistance of the spaced openings along the tool. The openings can be offset different distances as measured from each end of the tool so that two different offset scales are provided.

The tool can be fabricated from any suitable material that can retain an edge. Any suitable manufacturing technique may be used. Thus, numerous plastic materials and metals such a aluminum may be used and the article may be cut from bar stock, molded or extruded. Also, while a relatively small pocket tool size is easiest to use, the guide tool of the invention may be made in any convenient size. A typical size may be about 6 inches long by 1 inch wide with a step 1 inch from one end. A typical thickness might be ¼ inch with an additional ¼ inch at the step.

BRIEF DESCRIPTION OF THE DRAWINGS

In the drawings wherein like numerals depict like parts throughout the same.

DETAILED DESCRIPTION

Figure 1:
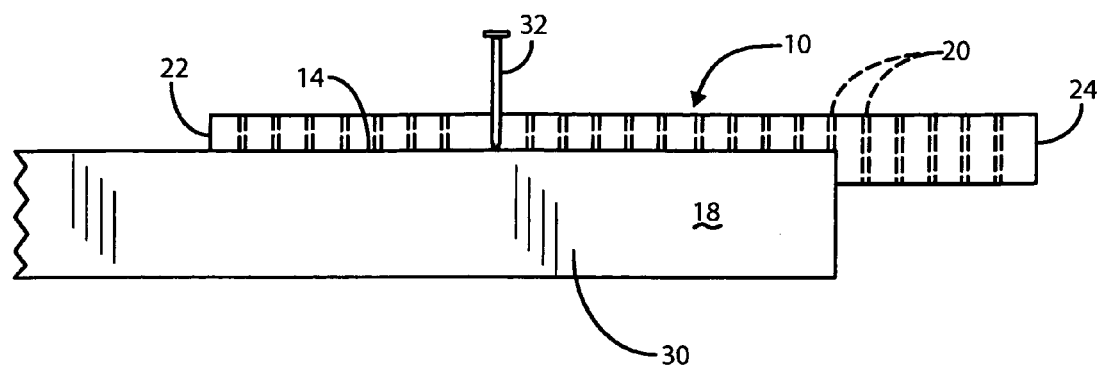
FIG. 1 is an end view of a work piece showing the guide tool of the invention in one disposition for scribing a line along the work piece.

The following description is directed to an example embodiment of the guide tool of the invention intended to convey the concept of the invention, but not to limit the scope of the invention in any manner. With this in mind, the embodiment illustrated in the drawing figures will next be described.

Figure 3:
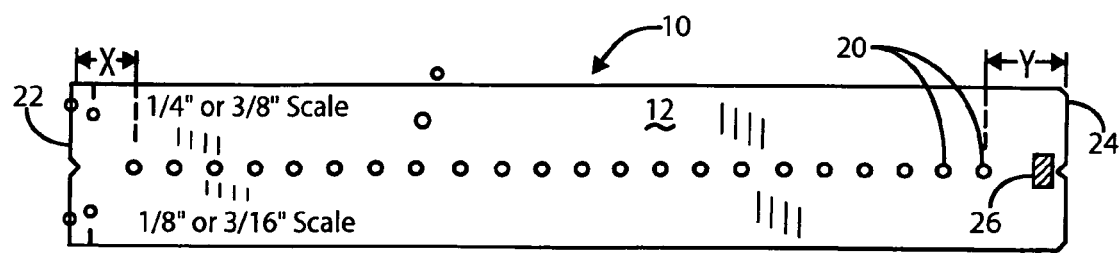
FIG. 3 is a top view of the flat side of the guide tool of FIGS. 1 and 2.
Figure 4:
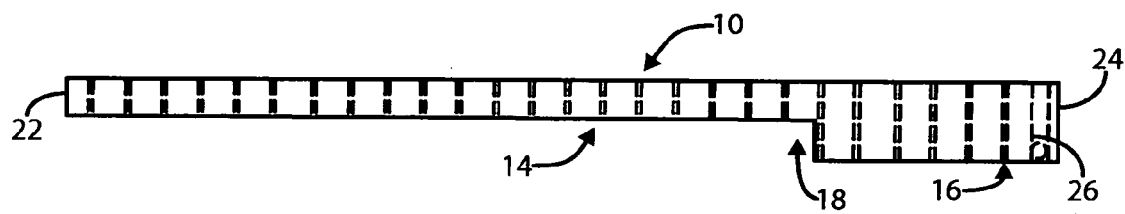
FIG. 4 is a side elevational view of the guide tool of FIG. 3.

FIGS. 3 and 4 depict a top view of the flat side of the guide tool of the invention and a side elevational view, respectively. The guide tool, depicted generally by 10, is preferably in the form of a bar that is generally rectangular in shape and has a planer or flat side 12 and a stepped side 14 characterized by a thicker section 16 forming a step at 18. The tool includes a series of aligned, evenly spaced openings or holes as at 20 which extend along the length or longer dimension of the guide tool and define a scale which can be used to measure distances between the holes or openings 20 or between the holes and either end of the tool 10. Thus, for example, a series of openings 20 may begin a distance "X" from one end 22 of the guide tool 10 and a distance "Y" from the stepped end 24. The distances "X" and "Y" may be chosen as desired, it being preferred that "X" and "Y" be different dimensions so that measurements from end 22 of the guide tool 10 will present an offset or different scale from measurements from the end 24. Thus, if the openings 20 are provided as ¼ inch intervals, the dimensions "X" and "Y" may differ, for example, by ⅛ inch, thereby enabling measurements with ⅛ inch increments.

Figure 5:
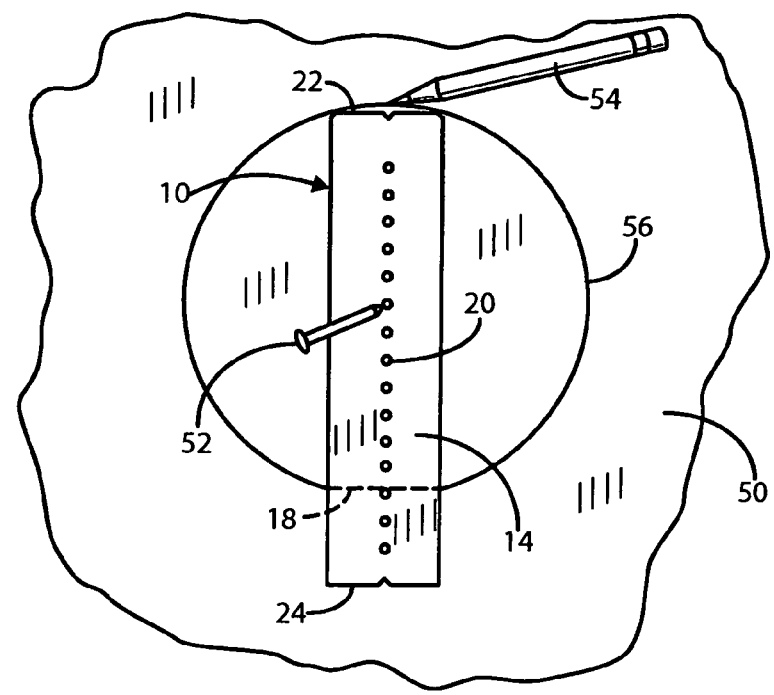
FIG. 5 is a fragmentary view of the stepped side of the guide tool illustrating use of the guide tool of the invention for scribing an arc or circle.

Of course, other scales can be implemented, including those with different units, as desired, and dimensions can be placed both on the flat side as shown in FIG. 3 and on the stepped side as well (see FIG. 5). Additional or other series of openings may be added in any pattern desired, not necessarily evenly spaced. The guide tool of the invention can further be provided with one or more magnets as at 26 to facilitate the starting of fastening devices such as nails, as will be described. One embodiment was 6⅛ inches long by 1 inch wide by ¼ stepped to ½ inch thick and included openings at ¼ inch intervals starting ⅛ inch from one end, thereby yielding a ⅛ inch end-to-end offset.

Figure 2:
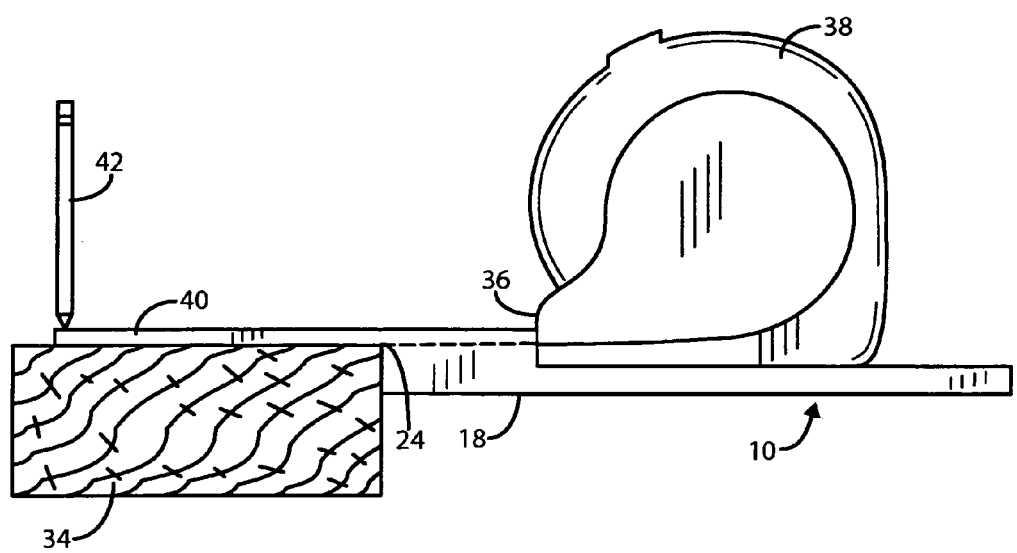
FIG. 2 depicts an end view of a work piece showing the guide tool of the invention in the second disposition for scribing the work piece in association with a retractable tape.

FIGS. 1 and 2 depict two common dispositions and uses of the guide tool of the invention which illustrate the versatility of the tool in marking work pieces. FIG. 1 depicts a work piece 30 being addressed by the one-piece or unitary guide tool of the invention in a disposition such that the step 18 and the stepped side 14 engage the edge and top of the work piece 30, respectively. A marking tool 32 is shown extending through one of the openings 20 in the guide tool such that moving the guide tool 10 along the edge of the work piece 30 enables one to scribe a line equidistant from and along the edge utilizing the nail or other marking device 32.

FIG. 2 depicts a further work piece 34 being addressed by the guide tool 10 in a different disposition. In this application, the end of the tool 24 engages the edge of the work piece 34 and the step 18 engages the dispensing end 36 of a retractable tape housing 38. The tape 40 is shown extended the desired amount for the line to be scribed along the work piece 34 as by a pencil 42. Thus, one holding the guide tool 10 with the tape housing 38 with one hand and the pencil 44 with the other can easily scribe a line along the work piece 34 without the need to touch the work piece 34 itself.

FIG. 5 depicts a reduced size fragment of the guide tool 10 with the flat side against a work piece 50. Pivoting the tool 10 about a nail or other device 52 extending through an opening 20 enables one using a pencil as at 54 or other marker addressing the end 22 to scribe a circle such as that shown at 56. This technique enables arcs or circles of any size within the scale between openings 20 to be drawn also taking into consideration that arcs and circles of different radii can also be scribed using the end 24 rather than 22. Also, any of the openings 20, remote from the pivotal opening 52, can also be used to scribe an arc about the point 52 which, of course, itself can be changed to any of the other openings 20.

Figure 7:
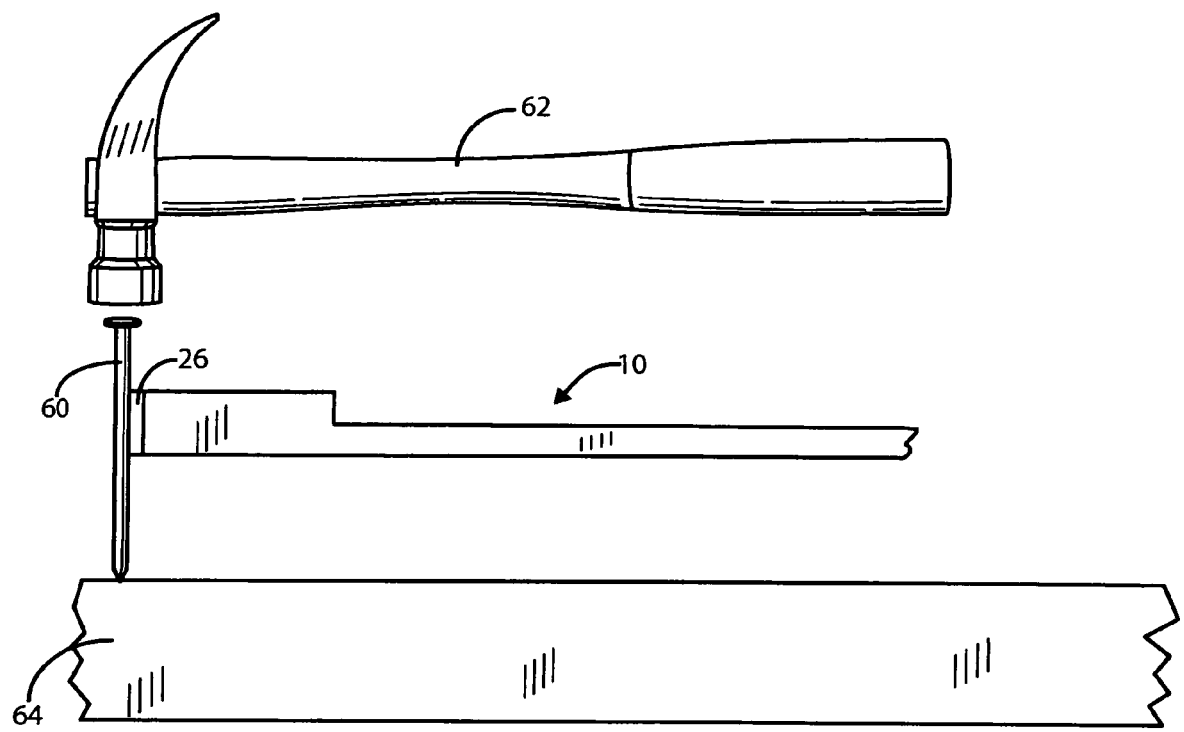

FIG. 7 depicts the use of the magnet 26 to hold a nail 60 in place to be driven by a hammer 62 into a work piece 64. This is particularly useful for starting nails in hard-to-reach locations which would be difficult to address when holding the nail by hand.

Figure 6:
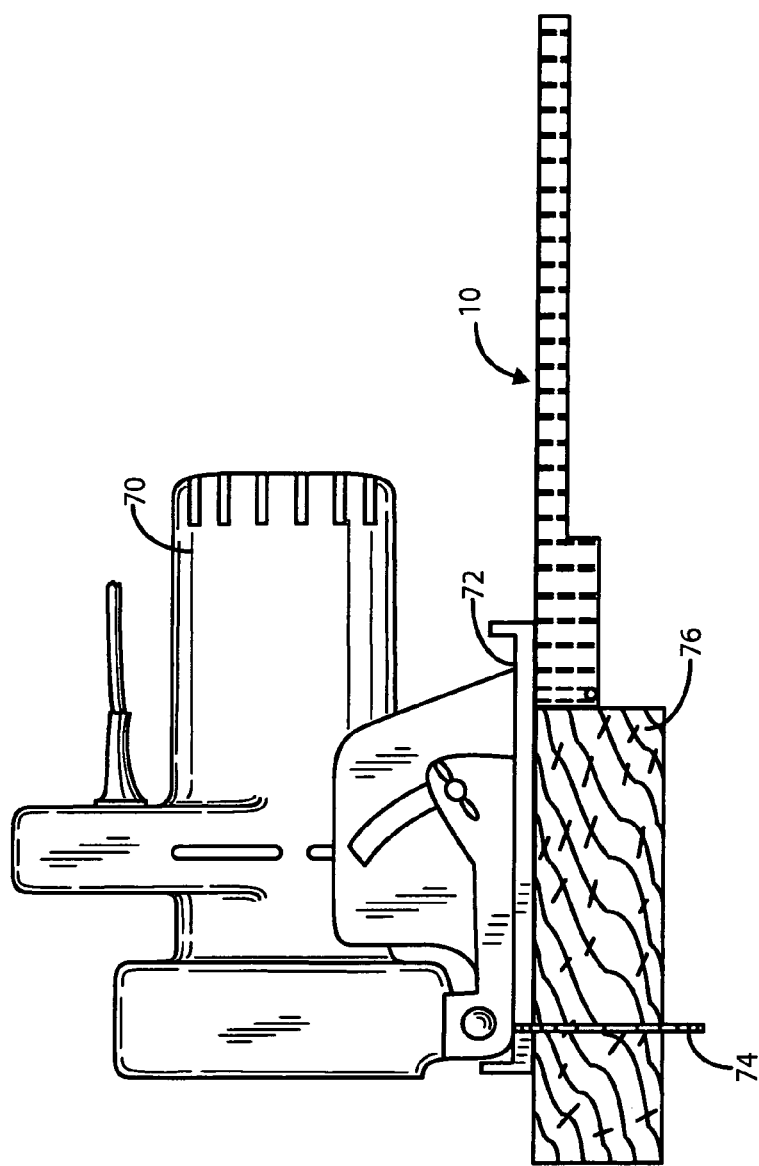
FIGS. 6 and 7 depict yet still other uses of the guide tool of the invention.

FIG. 6 depicts yet another use for the unitary marking and guide tool of the invention related to a rotating saw 70, which is provided with a, foot 72 and includes a rotating blade 74. The foot can be clamped by hand or otherwise to the tool 10 so that the blade resides at a desired distance from the edge of the work piece. The saw is then used to cut or rip a work piece as at 76.

The guide tool of the invention may be made of any suitable material such as molded or sheet plastics of various types including high impact polymer materials or metals such as aluminum, if desired. In addition, the tool may be made any convenient size, but is preferably of a size which may conveniently be carried in a pouch or pocket. The light small one-piece construction of the marking guide tool of the invention enables it to be used quickly in any desired disposition.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A multi-use one-piece slender linear pocket-sized guide tool fabricated from a single component part that provides a guide for measuring and marking a work piece when moved along an edge thereof, the guide tool consisting of a generally rectangular offset or stepped straight bar shape having a relatively long planar side and a short slightly thicker section at one end forming a single stepped offset side opposite said planar side said offset for engaging the edge of a work piece in a first disposition with said planar side extending over said work piece and engaging a measuring tape dispensing housing in another disposition with said end of said thicker section abutting said work piece such that a measuring tape dispenser can abut said slightly thicker section and measuring tape can be dispensed over said slightly thicker section.

2. A guide tool as in claim 1 further comprising a linear scale on at least one side thereof and including a series of aligned spaced openings through and along the longer dimension of said guide tool for use in marking said work piece with said stepped offset against an edge of a said work piece in said first disposition.

3. A guide tool as in claim 2 which, when placed on a work piece, enables a work piece to be scribed with the aid of said spaced openings, said spaced openings providing offset scales when addressed from opposite ends of said tool.

4. A guide tool as in claim 1 further comprising a magnet near at least one end thereof for holding a fastening device to be used with a work piece.

5. A guide tool as in claim 2 further comprising a pair of offset scales based on differences in measurements taken from opposite ends of said tool.

6. A guide tool as in claim 2 further comprising scales indexed on both opposed sides.

7. A guide tool as in claim 5 further comprising a pair of offset scales on both opposed sides.

8. A guide tool as in claim 2 wherein the aligned spaced openings are evenly spaced.

9. A guide tool as in claim 5 wherein the aligned spaced openings are evenly spaced.

* * * * *